United States Patent
Dvorkin

(10) Patent No.: US 6,381,471 B1
(45) Date of Patent: Apr. 30, 2002

(54) DUAL BAND RADIO TELEPHONE WITH DEDICATED RECEIVE AND TRANSMIT ANTENNAS

(76) Inventor: Vladimir A. Dvorkin, 7992 Pineville Cir., Castro Valley, CA (US) 94552

( * ) Notice: Subject to any disclaimer, the term of this patent is extended or adjusted under 35 U.S.C. 154(b) by 0 days.

(21) Appl. No.: 09/343,910

(22) Filed: Jun. 30, 1999

(51) Int. Cl.$^7$ ................................................. H04M 1/00
(52) U.S. Cl. ........................ 455/552; 455/553; 455/272; 343/702
(58) Field of Search ................................. 455/129, 280, 455/552, 553; 343/702

(56) References Cited

U.S. PATENT DOCUMENTS

| | | | |
|---|---|---|---|
| 5,365,246 A | | 11/1994 | Rasinger et al. ............ 343/702 |
| 5,650,792 A | * | 7/1997 | Moore et al. ................ 343/725 |
| 5,768,691 A | | 6/1998 | Matero et al. ................. 455/78 |
| 5,794,159 A | * | 8/1998 | Portin .......................... 455/553 |
| 5,828,348 A | | 10/1998 | Tassoudji et al. ............ 343/895 |
| 5,884,149 A | * | 3/1999 | Jaakola ........................ 455/103 |
| 5,995,814 A | * | 11/1999 | Yeh .......................... 455/180.1 |
| 6,075,996 A | * | 6/2000 | Srinivas ....................... 455/552 |
| 6,088,348 A | * | 7/2000 | Bell, III et al. ............. 370/343 |
| 6,215,988 B1 | * | 4/2001 | Matero ..................... 455/188.1 |
| 6,246,866 B1 | * | 6/2001 | Phang et al. .............. 455/188.2 |

OTHER PUBLICATIONS

By Z.D. Liu & P.S. Hall, "Dual–Band Antenna for Hand Held Telephones", Electronic Letters, Mar. 28, 1996, vol. 32, No. 7, pp. 609–610.

By L.E. Larson, Handbook, "RF and Microwave Circuit Design for Wireless Communications", Artech House, Inc., 1996, pp. 45–51.

* cited by examiner

Primary Examiner—Daniel Hunter
Assistant Examiner—Lana Le

(57) ABSTRACT

A dual band radio telephone with separate dual band, dual feed point transmit and receive antennas. The dual band radio telephone has two transceivers. Two feed points of the dual band, dual feed point receive antenna are coupled to respective receive branches of the two transceivers. Two feed points of the dual band, dual feed point transmit antenna are coupled to respective transmit branches of the two transceivers. Additionally, image reject band pass filters are coupled between the feed points of the dual band, dual feed point receive antenna and the respective receive branches. When the dual band, dual feed point transmit and receive antennas are spaced apart closely, the transmit branches comprise transmit filters coupled between transmit power amplifiers and the two feed points of the dual band transmit antenna.

11 Claims, 2 Drawing Sheets

DUAL BAND RADIO TELEPHONE WITH DEDICATED RECEIVE AND TRANSMIT ANTENNAS

BACKGROUND OF THE INVENTION

1. Field of the Invention

The present invention relates to a dual band radio telephone for receiving and transmitting of radio signals in a first and a second frequency band, and to a method of receiving and transmitting of such radio signals. Such a radio telephone can be a dual band cellular or satellite phone, or the like. The radio signals can carry full duplex radio telephony signals, such as in a dual band AMPS/CDMA system, or quasi full duplex radio telephony signals, such as in a GSM/IDCS1800 system, or a mix of full duplex and quasi full duplex signals. Typically, in dual band cellular telephony, frequencies in the first and second frequency bands are separated by a 1:2 ratio, GSM operating a 900 MHz band and DCS1800 operating in an 1800 MHz band.

2. Description of the Related Art

In the U.S. Pat. No. 5,768,691, antennas and antenna circuitry for a dual band radio telephone are disclosed. Disclosed are various circuits for coupling first and second transceivers of the dual band radio telephone to transmit/receive antennas, such as coupling of an internal dual band, dual feed point transmit/receive antenna to the first transceiver through a first duplexer or frequency splitter, and to the second transceiver through a first duplexer. Such a circuit, comprising duplexers, is typically meant for full duplex radio telephony signals. Another antenna coupling circuit is disclosed, typically meant for quasi fill duplex systems in which there is no simultaneous transmission and reception, with transmit/receive switches instead of duplexers. Both duplexers and transmit/receive switches exhibit insertion losses. A duplexer typically causes transmitter output losses of up to 3 dB so that the overall transmitter efficiency is reduced, or, stated differently, battery energy from a radio telephone battery is wasted so that a radio telephone talk time is reduced.

Other transmit/receive antenna and circuit configurations in radio telephones are known. In one type of a dual band mobile phone, such as an AMPS/CDMA radio telephone, a dual band transmit/receive whip antenna is coupled to a dual band diplexer followed by transmit/receive duplexers for the respective frequency bands. In another type of radio telephone with a shared dual band whip antenna, for TDMA or GSM systems, transmit/receive switches are used instead of duplexers. In still other type of dual band mobile phones, a single feed point of an embedded dual band transmit/receive antenna, i.e., an antenna internal a housing of the radio telephone, is coupled to respective transmit/receive duplexers, or to respective transmit/receive switches, of respective transceivers comprised in the radio telephone through a diplexer, the duplexers being applied in a dual band AMPS/CDMA phone, and the switches being applied in a TDMA/GSM phone.

In the article "Dual-band antenna for hand held portable telephones", Z. D. Liu and P. S. Hall, ELECTRONICS LETTERS, Mar. 28, 1996, VoL 32, No. 7, pages 609–610, a dual band, dual feed point transmit/receive antenna is disclosed. The disclosed antenna is a so-called planar dual-band inverted F-antenna exhibiting two different resonance frequencies, at 900 MEz and at 1800 MHz. When such an antenna is applied in a dual band radio telephone for full duplex telephony signals, such as an AMPS/CDMA phone, in accordance with the analog US cellular and TIA IS-95 Standards, or for quasi duplex telephony signals, such as a TDMA/JGSM phone, in accordance with the TIA IS-136 and GSM Standards, a diplexer can be dispensed with, but duplexers or antenna switches are still needed.

In the U.S. Pat. No. 5,828,348, a dual-band octafilar helix antenna is disclosed, particularly suitable for satellite communication.

So, dual band radio telephones are known at least comprising transmit/receive duplexers or transmit/receive switches, such duplexers or switches exhibiting undesirable insertion losses.

In the handbook, "RF and Microwave Circuit Design for Wireless Commnications", L. E. Larson, Artech House, Inc., 1996, pages 45–51, the phenomenon of the occurrence of image rejection frequencies is described. It is well-known in the art that such undesired image frequencies can be rejected by image reject mixers, by image reject band pass filter, or by a combination thereof, in conjunction with duplexers if the case may be.

SUMMARY OF THE INVENTION

It is an object of the invention to provide a dual band radio telephone with reduced insertion losses.

It is another object of the invention to comply with image frequency rejection requirements in a dual band radio telephone.

It is still another object of the invention to comply with transmit-receive separation requirements in a dual band radio telephone.

In accordance with the invention, a dual band radio telephone is provided comprising: a first transceiver with a first receive branch and a first transmit branch, said first transceiver being operable in a first frequency band;
- a second transceiver with a second receive branch and a second transmit branch, said second transceiver being operable in a second frequency band;
- a dual band receive antenna comprising a first receive radiator and first receive feed point coupled to said first receive radiator, and a second receive radiator and a second receive feed point coupled to said second receive radiator, said first and second receive radiators being operable in said first and second frequency bands, respectively; and
- a dual band transmit antenna comprising a first transmit radiator and first transmit feed point coupled to said transmit radiator, and a second transmit radiator and a second transmit feed point coupled to said second transmit radiator, said first and second transmit radiators being operable in said first and second frequency bands, respectively,
    said first and second receive feed points being coupled to said first and second receive branches, respectively, and said first and second transmit feed points being coupled to said first and second transmit branches, respectively.

An advantage is that, because of reduced receive and transmit losses, a radio telephone battery is exhausted at a slower pace so that the radio telephone has a longer talk time. This is because removal of a duplexer achieves a better power efficiency of the transmitter amplifier, the transmitter amplifier consuming a major part of the radio telephone battery's energy.

In order to fill image frequency rejection requirements, image reject band pass filters are provided between the receive feed points in the respective receive branches and inputs of the respective low noise amplifiers in the radio telephone, for at least partly rejecting undesired image frequencies in the respective frequency bands. As such, the occurrence of image frequencies, and image reject band pass filters to reject such image frequencies are well-known in the art. Further image frequency rejection can be done in image reject band pass filters following the low noise amplifiers, and even still further by image reject mixers for downconverting the received radio signals.

Although in principle no output filtering is required of output signals from the transmit power amplifiers, because there is no galvanic path between the transmit power amplifier outputs and the receive branches, and thus, in principle, no natural path loss, some filtering might be required when the dual band, dual feed point receive antenna and the dual band, dual feed point transmit antenna are placed at a relatively close distance internal the housing of the radio telephone. But such an additional power amplifier output filtering will exhibit much less insertion loss as compared to insertion losses due to a duplexer. Typically, the transmit portion of a duplexer gives rise to an insertion loss of some 3 dB, only 1 dB or so insertion loss being caused by such additional transmit power amplifier filtering.

DESCRIPTION OF THE PREFERRED EMBODIMENT

Figure 1:
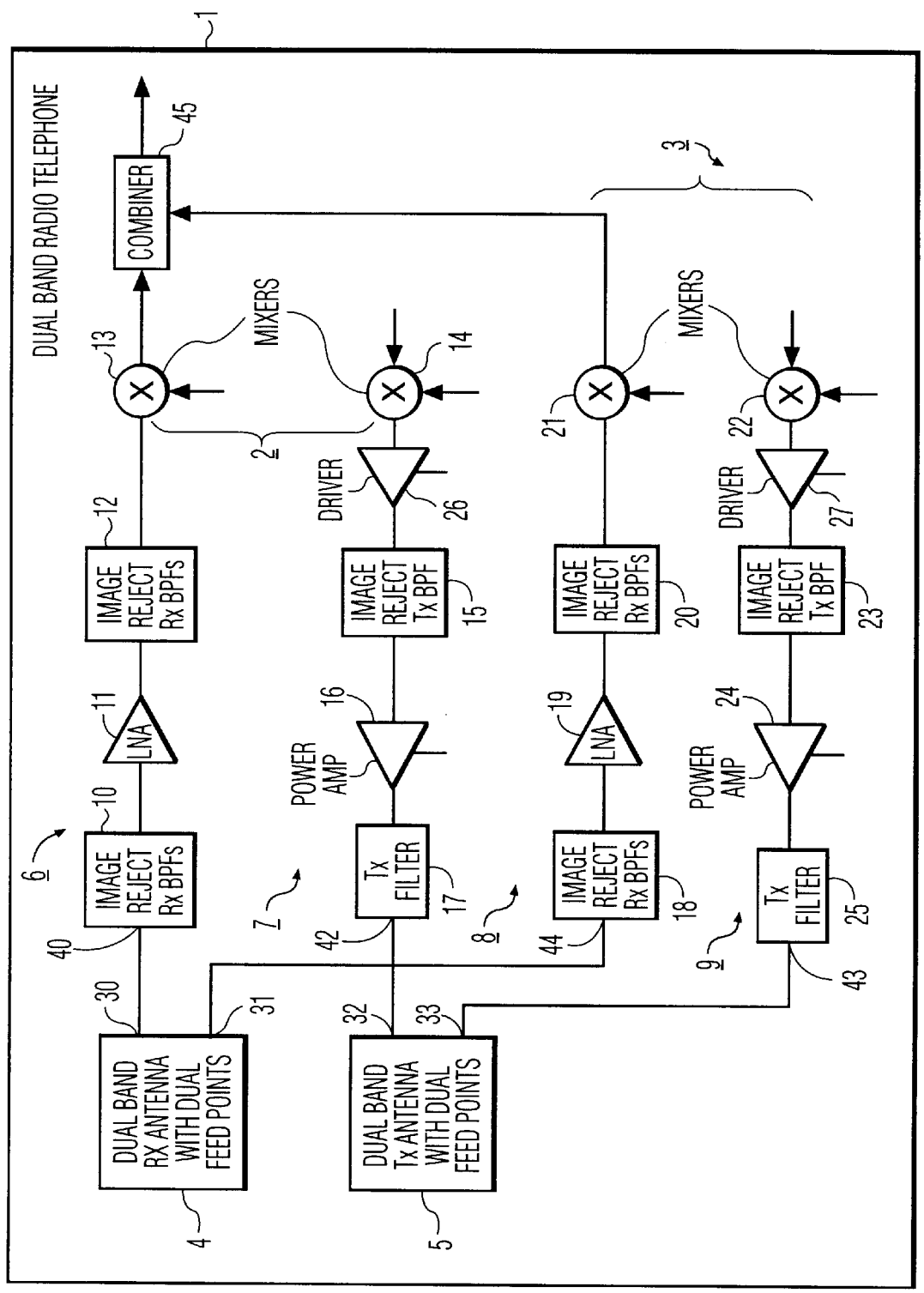
FIG. 1 shows a block diagram of a dual band radio telephone according to the invention

FIG. 1 shows a block diagram of a dual band radio telephone 1 according to the invention. The radio telephone 1 comprises a first transceiver 2 for transmitting and receiving of radio signals in a first frequency band, and a second transceiver 3 for transmitting and receiving of radio signals in a second frequency band. The first frequency band can be an analog US AMPS band, and the second frequency band can be a US CDMA band, the frequencies in these bands typically being separated by a 1:2 ratio, and the radio telephony signals in carried in these bands being full duplex signals, either voice or data, or any other suitable dual band. The dual band radio telephone 1 comprises an internal dual band, dual feed point receive antenna 4 and an internal dual band, dual feed point transmit antenna 5, the receive antenna 4 receiving radio signals in both the first and second frequency band, and the transmit antenna 5 transmitting radio signals in both the first and the second frequency band. The antennas 4 and 5 are embedded in a housing (not shown in detail here) of the radio telephone 1, at any suitable location depending on the specific product requirements. The location of the antennas inside the housing is not part of the present invention but is at choice of the designer of the radio telephone 1. Preferably, the embedded antenna is grounded to the housing and radio frequency signals are fed to and picked from the antenna by a coaxial cable, or by micro-strip or strip lines, or the like, directly mounted on a printed circuit board of the radio telephone 1. The transceiver 2 comprises a receive branch 6 and a transmit branch 7, and the transceiver 3 comprises a receive branch 8 and a transmit branch 9. The receive branch 6 comprises an image reject band pass filter 10 followed by a low noise amplifier 11, an output of the low noise amplifier being coupled to an image reject band pass filter 12. The filter 12 is coupled to a mixer 13 for mixing down a received radio signal in the first frequency band to a lower frequency. The lower frequency can be at IF or zero-IF, depending on the further structure of the radio telephone 1. The transmit branch 7 comprises a mixer 14, followed by an image reject transmit band pass filter 15, a power amplifier 16, and a transmit filter 17. Similarly, the receive branch 8 comprises an image reject band pass filter 18, a low noise amplifier 19, an image reject band pass filter 20, and a mixer 21, the mixer 21 mixing down a received radio signal in the second frequency band, and the transmit branch comprises a mixer 22, an image reject transmit band pass filter 23, a power amplifier 24, and a transmit filter 25. The transmit branches 7 and 9 further comprise drivers 26 and 27, respectively. In principle the transmit filters 17 and 25 can be dispensed with, but some additional transmit filtering may be required if the antennas 4 and 5 are spaced apart too closely inside the housing of the radio telephone 1 and/or to meet the requirements for spurious frequency rejections, such as required by the FCC. The dual band receive antenna 4 comprises a first receive feed point 30 and a second receive feed point 31, and the dual band transmit antenna 5 comprises a first transmit feed point 32 and a second transmit feed point 33. According to the present invention, the first receive feed point 30 is coupled to an input 40 of the filter 10, the second receive feed point 31 is coupled to an input 41 of the filter 18, the first transmit feed point 32 is coupled to an output 42 of the transmit filter 17, and the second transmit feed point 33 is coupled to an output 43 of the transmit filter 25. Typically radio telephones require an image rejection of some 60 dB. The receive image reject filters 10, 12, 18, and 20 achieve such a required image frequency rejection The mixers 13 and 21 of the respective receive branches 6 and 8 are coupled to a combiner 45 that is coupled to a receiver back end (not shown in detail). Receiver back ends are well-known as such and can be of a type comprising further mixers or of a base band only type.

Figure 2:
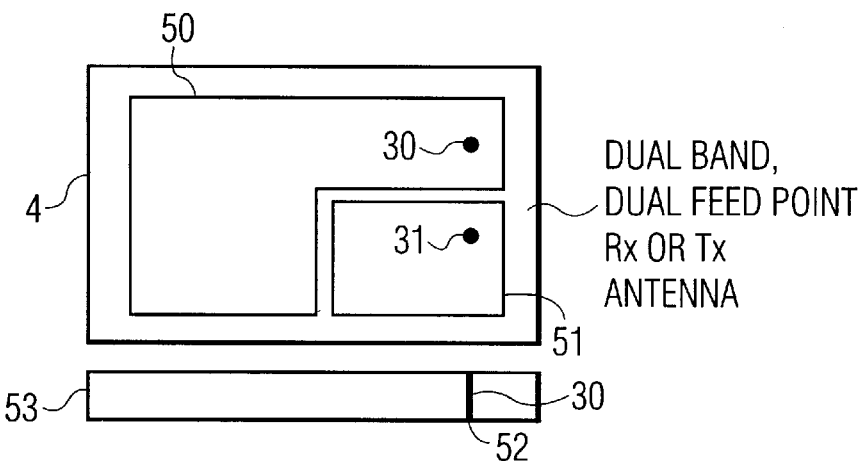
FIG. 2 shows a first embodiment of a dual band, dual feed point internal or embedded antenna suitable for use in a dual band radio telephone according to the invention.

FIG. 2 shows a first embodiment of the dual band, dual feed point internal or embedded receive antenna 4 suitable for use in a dual band radio telephone 1 according to the invention, the antenna 4 being of a planar type. The dual band, dual feed point antenna 5 is similar in construction and is not shown separately here. Shown is a plan view with an L-shaped first radiator 50, for the lower frequency band, and a rectangular shaped second radiator 51, for the higher frequency band, and further a cross-sectional view showing a conductive feed-through 52 in a substrate 53 for connection of the receive feed points to a coaxial cable (not shown). The resonance frequency of the L-shaped part is approximately the velocity of light divided by four times the sum of the width and the length of the radiator 51.,The size of the radiator 51 is determined using the same formulas as a so-called planar inverted F-antenna for single frequency antennas, such inverted F-antennas being known in the art.

Figure 3:
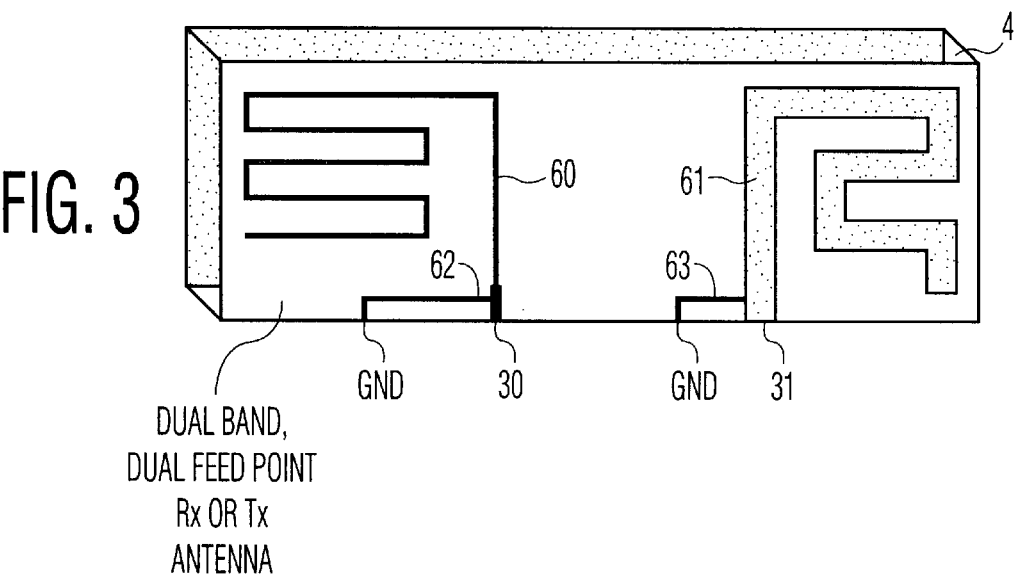
FIG. 3 shows a second embodiment of a dual band, dual feed point internal antenna suitable for use in a dual band radio telephone according to the invention.

FIG. 3 shows a second embodiment of the dual band, dual feed point internal receive antenna 4 suitable for use in a dual band radio telephone 1 according to the invention. The dual band, dual feed point antenna S is similar in construction and is not shown separately here. The antenna 4 comprises a meander-type radiator 60 for the US Cellar band (AMPS, TDMA, CDMA) and a meander-type radiator for the US PCS band (TDMA/ICDMA). At the feed points 30 and 31, matching traces 62 and 63 are provided, respectively, which are connected to ground, for matching the antenna to a feed impedance, e.g., 50 Ohms.

Figure 4:
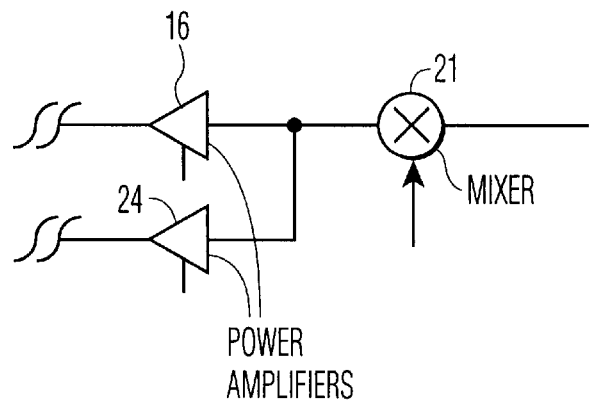
FIG. 4 shows an alternative embodiment of the transmit branches.

FIG. 4 shows an alternative embodiment of the transmit branches 7 and 9. Instead of two mixers only the single mixer 21 is provided. The power amplifiers 16 and 24 can be activated for the respective transmit frequency bands. The mixer 21 is controlled by a controllable synthesizer (not shown in detail) of which a frequency is set in accordance with the desired band.

The invention can be used with current and fixture frequency bands, or any other suitable frequency band, for both terrestrial and satellite mobile radio, or any other suitable radio system Present and future cellular band are as follows:

|  | Tx (MHz): | Rx (MHz): |
|---|---|---|
| US Cellular: | 824.04–848.97 | 869.040–893.970 |
| US PCS: | 1850.00–1909.95 | 1930.000–1989.950 |
| GSM: | 880.2–914.8 | 925.2–959.8 |
| DCS1800: | 1710.2–1784.8 | 1805.2–1879.8 |
| PCS1900: | 1850.2–1909.8 | 1930.2–1989.8 |
| UMTS (FDD): | 1920–1980 | 2110–2170 |

In principle, at least one of the antennas 4 and 5 can be antennas external to the housing of the radio telephone 1. In such an embodiment, the then external antenna can be of a dual band octafilar helix antenna type, rendering the radio telephone 1 more suitable for satellite communication. For terrestrial communication, however, it is preferred that the antennas 4 and 5 are internal antennas, mobile radio devices becoming smaller and smaller.

In view of the foregoing it will be evident to a person skilled in the art that various modifications may be made within the spirit and the scope of the invention as hereinafter defined by the appended claims and that the invention is thus not limited to the examples provided. The dual band antennas 4 and 5 can also be implemented as two physically separated antennas, It is to no be understood that the word "comprising" in the appended claims does not exclude the presence of other elements or steps than those listed in a claim

What is claimed is:

1. A dual band radio telephone comprising:
   a first transceiver with a first receive branch and a first transmit branch, said first transceiver being operable in a first frequency band;
   a second transceiver with a second receive branch and a second transmit branch, said second transceiver being operable in a second frequency band;
   a dual band receive antenna comprising a first receive radiator and first receive feed point coupled to said first receive radiator, and a second receive radiator and a second receive feed point coupled to said second receive radiator, said first and second receive radiators being operable in said first and second frequency bands, respectively, and
   a dual band transmit antenna comprising a first transmit radiator and first transmit feed point coupled to said transmit radiator, and a second transmit radiator and a second transmit feed point coupled to said second transmit radiator, said first and second transmit radiators being operable in said first and second frequency bands, respectively,
   said first and second receive feed points being coupled to said first and second receive branches, respectively, and said first and second transmit feed points being coupled to said first and second transmit branches, respectively.

2. A dual band radio telephone as claimed in claim 1, wherein said first receive branch comprises a first image reject band pass filter for at least partly rejecting a first image frequency in said first frequency band, and a first low noise amplifier, and said second receive branch comprises a second image reject band pass filter for at least partly rejecting a second image frequency in said second frequency band, and a second low noise amplifier, said first image reject band pass filter being coupled between said first receive feed point and said first low noise amplifier, and said second image reject band pass filter being coupled between said second receive feed point.

3. A dual band radio telephone as claimed in claim 2, wherein said first receive branch comprises a third image reject band pass filter coupled to an output of said first low noise amplifier, and a fourth image reject band pass filter coupled to an output of said second low noise amplifier.

4. A dual band radio telephone as claimed in claim 2, wherein said first transmit branch comprises a first transmit power amplifier and a first transmit filter, and said second transmit branch comprises a second transmit power amplifier and a second transmit filter, said first transmit filter being coupled between said first transmit amplifier and said first transmit feed point, and said second transmit filter being coupled between said second transmit amplifier and said second transmit feed point.

5. A dual band radio telephone as claimed in claim 1, comprising a housing, said dual band receive and transmit antennas being antennas internal said housing.

6. A dual band radio telephone as claimed in claim 1, comprising a housing, said dual band receive and transmit antennas being antennas external said housing.

7. A dual band radio telephone as claimed in claim 1, comprising a housing, one of said dual band receive and transmit antennas being an antenna internal said housing, and another one of said dual band receive and transmit antennas being an antenna external said housing.

8. A dual band radio telephone as claimed in claim 5, wherein said dual band receive and transmit antennas are of a planar type.

9. A dual band radio telephone as claimed in claim 5, wherein said dual band receive and transmit antennas are of a meander-type.

10. A dual band radio telephone as claimed in claim 6, wherein said dual band receive and transmit antennas are of a dual band helix antenna type.

11. A method of receiving and transmitting of radio signals in a first and a second frequency band, said method comprising:
   receiving a first radio signal in said first frequency band, and receiving a second radio signal in said second frequency band, by a dual band receive antenna having a first receive feed point and a second receive feed point, and transmitting a third radio signal in said first frequency band, and transmitting a fourth radio signal in said second frequency band, through a dual band transmit antenna having a first transmit feed point and a second transmit feed point,
   said first and second radio signals appearing at said first and second receive feed points, respectively, and said third and fourth radio signals being provided to said first and second transmit feed points, respectively.

* * * * *